United States Patent
Regis et al.

(10) Patent No.: US 11,204,199 B2
(45) Date of Patent: Dec. 21, 2021

(54) OVEN FOR CARRYING OUT HEAT TREATMENTS OF FRICTION ELEMENTS, IN PARTICULAR BRAKE PADS, AND ASSOCIATED METHOD

(71) Applicant: ITT ITALIA S.r.l., Lainate (IT)

(72) Inventors: Pierluigi Regis, Barge (IT); Sergio Ferrero, Barge (IT); Francesco Laureri, Barge (IT)

(73) Assignee: ITT Italia S.r.l.

( * ) Notice: Subject to any disclaimer, the term of this patent is extended or adjusted under 35 U.S.C. 154(b) by 776 days.

(21) Appl. No.: 16/070,650

(22) PCT Filed: Jan. 18, 2017

(86) PCT No.: PCT/IB2017/050267
§ 371 (c)(1),
(2) Date: Jul. 17, 2018

(87) PCT Pub. No.: WO2017/125865
PCT Pub. Date: Jul. 27, 2017

(65) Prior Publication Data
US 2021/0207887 A1   Jul. 8, 2021

(30) Foreign Application Priority Data

Jan. 18, 2016   (IT) .................. 102016000003929

(51) Int. Cl.
*H05B 6/42*   (2006.01)
*H05B 6/12*   (2006.01)
(Continued)

(52) U.S. Cl.
CPC .............. *F27B 9/067* (2013.01); *B65G 15/48* (2013.01); *F27B 9/24* (2013.01); *F27B 9/3005* (2013.01);
(Continued)

(58) Field of Classification Search
CPC .... F27B 9/067; F27B 9/24; F27B 9/30; F27B 9/36; B65G 15/48; F27D 17/00; H05B 6/105; H05B 6/42
(Continued)

(56) References Cited

U.S. PATENT DOCUMENTS 2,454,708 A  *  11/1948  Middleton .............. C04B 33/30
                                                    219/601
2003/0111459 A1    6/2003  Nishimura
(Continued)

FOREIGN PATENT DOCUMENTS

| DE | 10 2011 102 659 A1 | 11/2012 |
| WO | WO 2010/108744 A1 | 9/2010 |
| WO | WO 2014/162282 A1 | 10/2014 |

OTHER PUBLICATIONS

International Search Report and Written Opinion for PCT/IB2017/050267; dated Apr. 26, 2017; 13 pages.

*Primary Examiner* — Quang T Van
(74) *Attorney, Agent, or Firm* — Barclay Damon LLP (57) ABSTRACT

A tunnel oven and associated method for the heat treatment of friction elements, and in particular braking elements such as brake pads is provided. The friction elements are arranged on a resting surface of a conveyor device, are moved between an inlet opening and an outlet opening of the tunnel oven, and are heated by irradiation by at least one heating device. The heating device includes a radiating plate made from stainless steel arranged facing the conveyor device and heated by electromagnetic induction using at least one inductor arranged facing the radiating plate and spaced apart therefrom on the side opposite to the conveyor device. A cooling air flow for the braking elements between the resting surface and the radiating plate is directed in counterflow to a feeding direction of the conveyor device.

16 Claims, 5 Drawing Sheets

(51) Int. Cl.
  *H05B 6/64*  (2006.01)
  *F27B 9/06*  (2006.01)
  *B65G 15/48*  (2006.01)
  *F27B 9/24*  (2006.01)
  *F27B 9/30*  (2006.01)
  *F27B 9/36*  (2006.01)
  *F27D 17/00*  (2006.01)
  *H05B 6/10*  (2006.01)
  *F16D 65/04*  (2006.01)
  *F27B 9/12*  (2006.01)
  *F27D 7/04*  (2006.01)
  *F27D 9/00*  (2006.01)
  *F27D 99/00*  (2010.01)

(52) U.S. Cl.
  CPC .............. *F27B 9/36* (2013.01); *F27D 17/008* (2013.01); *H05B 6/105* (2013.01); *H05B 6/42* (2013.01); *F16D 65/04* (2013.01); *F16D 2250/0038* (2013.01); *F27B 2009/126* (2013.01); *F27B 2009/3607* (2013.01); *F27D 2007/045* (2013.01); *F27D 2009/0075* (2013.01); *F27D 2099/0086* (2013.01)

(58) Field of Classification Search
  USPC ....... 219/656, 646, 650, 486, 483, 651, 645, 219/647, 653, 614, 662, 671; 373/140, 373/141, 139
  See application file for complete search history.

(56) References Cited

U.S. PATENT DOCUMENTS

2005/0035116 A1 2/2005 Brown et al.
2014/0352550 A1* 12/2014 Haas ........................ A21B 1/48
                      99/339
2019/0306930 A1* 10/2019 Huang .................... H05B 6/36

* cited by examiner

OVEN FOR CARRYING OUT HEAT TREATMENTS OF FRICTION ELEMENTS, IN PARTICULAR BRAKE PADS, AND ASSOCIATED METHOD

CROSS REFERENCE TO RELATED APPLICATIONS

This application is a national stage application filed pursuant to 35 U.S.C. § 371 of International Application No. PCT/IB2017/050267, filed Jan. 18, 2017, which claims priority of Italian Patent Application No. 102016000003929, filed Jan. 18, 2016, the entire contents of each application being herein incorporated by reference.

TECHNICAL FIELD OF THE INVENTION

The present invention relates to an oven and to an associated method for carrying out heat treatments of friction elements, in particular of braking elements such as brake pads.

BACKGROUND OF THE INVENTION

The friction materials used as linings in the brake shoes of drum brakes and as brake pads of disc brakes for vehicles or in other equipment (for example in clutch disks), after the completion of the braking element forming step, need to be subjected to heat treatments which will improve the characteristics thereof and which allow to eliminate any gaseous residues.

In particular, in the case of brake pads, the pads, upon leaving the forming press, are heated for a certain period of time at temperatures generally slightly higher than 200° C., usually by means of convection ovens.

Next, the brake pads, preferably cooled to room temperature, are subjected to a surface heat treatment using IR lamps; the brake pads, deposited on trays or on a conveyor belt, are fed through a tunnel oven having infrared heating, i.e. through a thermally insulated tunnel provided upon the ceiling thereof of a plurality of IR lamps that irradiate the pads placed upon the underlying conveyor belt. This type of treatment, unlike that one in a convection oven, the objective of which is to heat "the core" of the friction material, is designed to substantially heat only the surface of the blocks of friction material which are present on the braking elements undergoing the treatment step.

In general, the infrared radiation to which the brake pads are subjected has a power density of between 50 and 150 $kW/m^2$. Moreover, in order to control the temperature of the brake pads, the infrared treatment step is performed in the presence of a current of cooling air that continuously flows over the brake pads during treatment.

This type of oven and heat treatment are expensive and produce pollution; furthermore they also involve the use of generally very cumbersome plants.

In fact, firstly, in order to manage different volume quantities of brake pads, according to production requirements from time to time, infrared heating ovens are generally oversized and therefore work most of the time below the maximum rated output. This means that the oven and its accessories (filters, electrical and handling equipment, etc.) which make up the heat treatment plant are cumbersome and, above all, involve a large amount of wasted energy.

In addition, the IR lamps, in order to work properly, must be placed relatively far away from the elements to be treated, which means, on the one hand, that the beam of infrared rays emitted by the lamps radiates in the form of a cone consequently irradiating the underlying brake pads with varying intensity; and, on the other hand, there is the presence of a vast air chamber above the brake pads being treated within the tunnel, an air chamber that is crossed by the cooling air flow.

As a result, the air flow needed to adequately cool the brake pads during an IR treatment is very high (about 10,000 $m^3/h$), implying once again a considerable waste of energy and the heating of the brake pads t may not be uniform.

Lastly, during the heat treatment, the cooling air removes dust and volatile chemicals, which are released from the friction material. Due to the high volume of air that is circulated within the oven, however, these pollutants are dispersed at low concentrations within the cooling air, which, once the air is released into the atmosphere, renders the removal of said pollutants from the cooling air itself problematic. Also because of the relatively high temperature of the exhaust air, the filtering systems that must be adopted for the high volumes of air to be treated are in fact very cumbersome, expensive, and not completely reliable.

SUMMARY OF THE INVENTION

The purpose of the present invention is to provide an oven and an associated method for carrying out heat treatments of friction elements, in particular braking elements such as brake pads, which allow a large number of braking elements to be treated relatively quickly and with a relatively reduced bulk, while simultaneously ensuring low energy consumption, the use of a reduced cooling air flow rate and low or no environmental pollution.

The invention therefore relates to an oven and an associated method for carrying out heat treatments of friction elements, in particular a surface heat treatment for braking elements such as brake pads, having the features set forth in the annexed claims.

BRIEF DESCRIPTION OF THE DRAWINGS

Further characteristics and advantages of the present invention will become clear from the following description of an exemplary non-limiting embodiment thereof given purely by way of example and with reference to the figures in the accompanying drawings, wherein.

DETAILED DESCRIPTION

With reference to FIGS. 1-3, 5 and 6, indicated as a whole with reference number 1 is a plant for the heat treatment of braking elements 2, particularly brake pads (FIG. 3), known and for sake of simplicity illustrated only schematically. More generally, the plant 1, though designed to treat braking elements, can perform a desired heat treatment on friction elements of any type, for example clutch discs. In the following non limiting description, without any lack of generality, specific reference will be made to brake pads.

The plant 1 comprises a tunnel oven 3 specifically designed for the surface heat treatment of friction elements 2 as a substitute for traditional ovens with infrared lamps; the oven 3 comprises a tunnel shaped protective casing 4 extending longitudinally between its first and second open end 5 and 6, mutually opposing, the open ends delimiting an inlet opening 7 and an outlet opening 8 of the tunnel oven 3.

Figure 3:
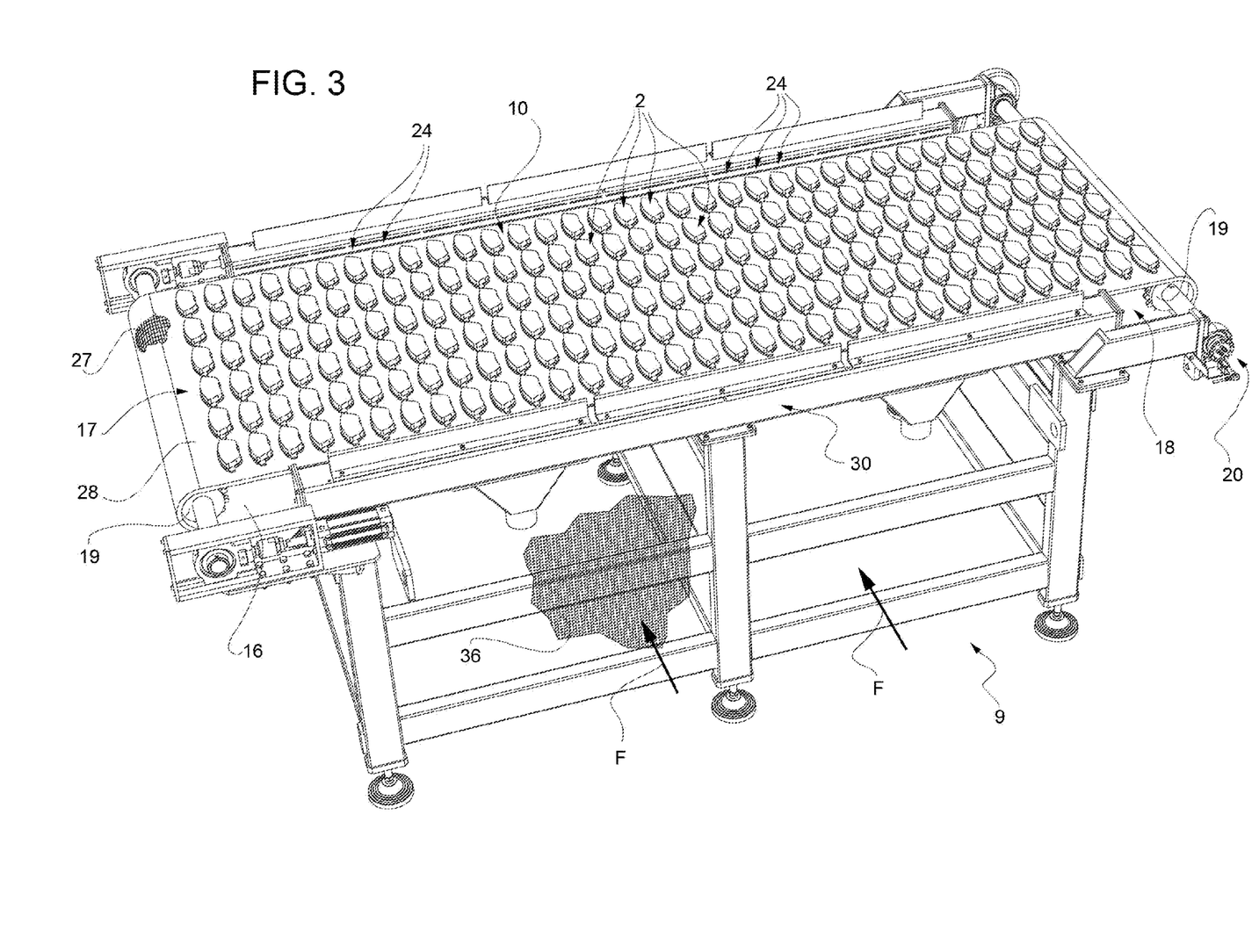
FIG. 3 shows in enlarged scale and in perspective view of three-quarters from above of a component of the tunnel oven according to the invention forming part of the plant of FIGS. 1 and 2.
Figure 5:
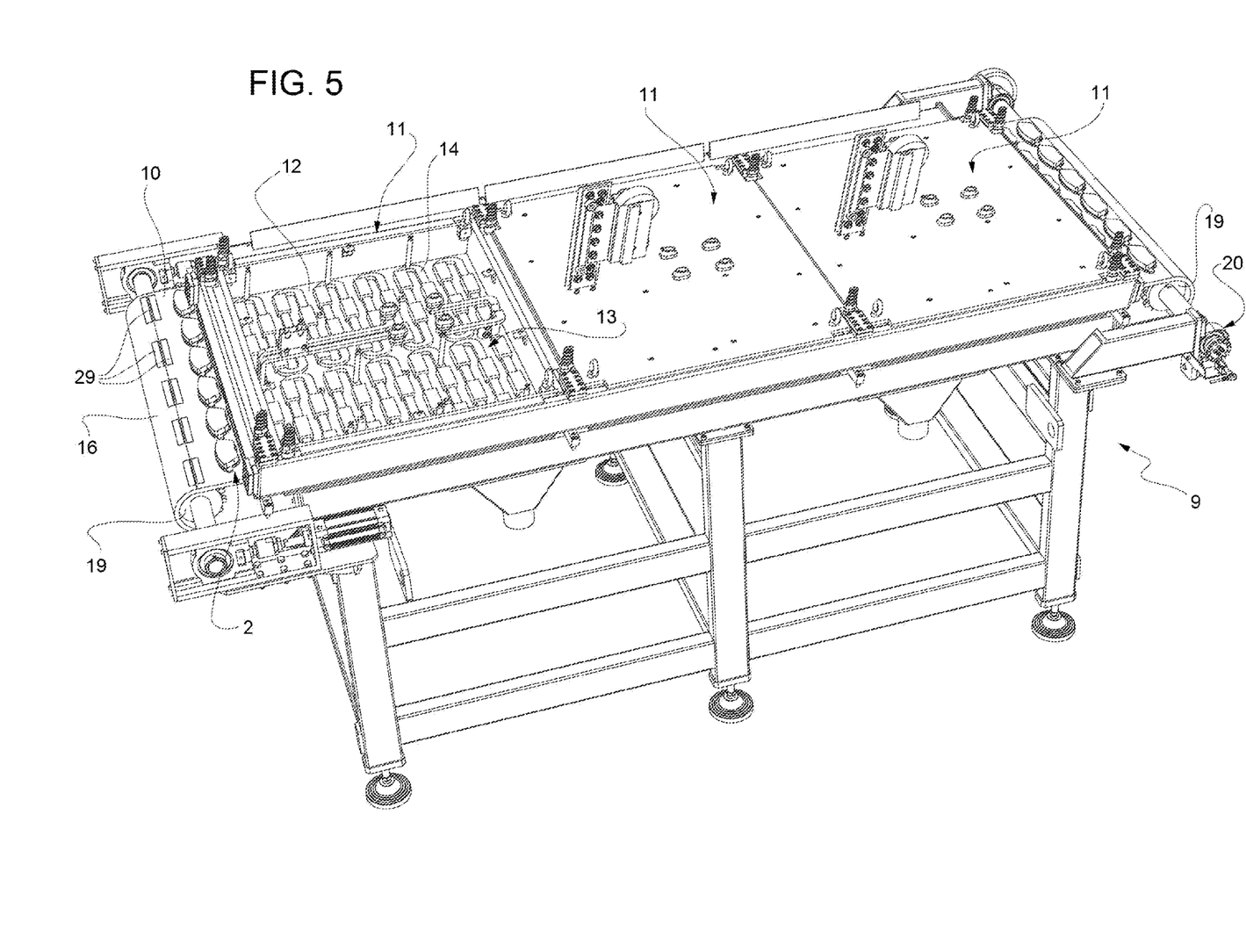
FIG. 5 shows the same view as FIG. 3 of the component of FIG. 3 and of other overlying components of the tunnel oven according to the invention forming part of the plant of FIGS. 1 and 2, with parts cut away in order to reveal further details.
Figure 7:
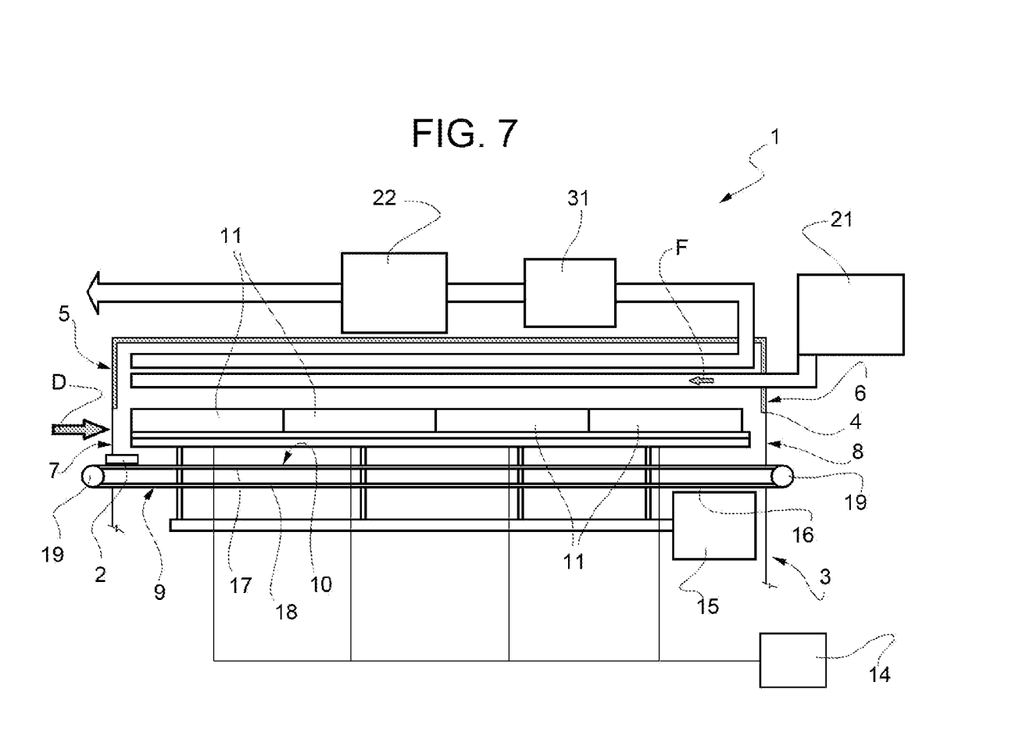

The tunnel oven 3 further comprises a conveyor device 9, clearly illustrated in FIG. 3, placed within the tunnel casing 4 and moving between the inlet 7 and outlet 8 openings, the conveyor device 9 having a resting surface 10 designed for receiving a plurality of friction elements 2 to be treated to transport them between the inlet opening 7 and the outlet opening 8; and at least one heating device 11 placed within the protective casing 4; in the non-limiting example illustrated, the oven 3 is provided with a plurality of heating devices 11, which are independent of each other, arranged in sequence within the tunnel casing 4 in a forward transport direction D (indicated by the arrow in FIG. 7) of the conveyor device 9; further, the tunnel shaped protective casing 4 which contains the plurality of heating devices 11, in the example illustrated in FIG. 5 in the number of three, in the embodiment illustrated schematically in FIG. 7 in the number of four, is insulated in order to avoid dispersions of heat towards the outside.

Figure 6:
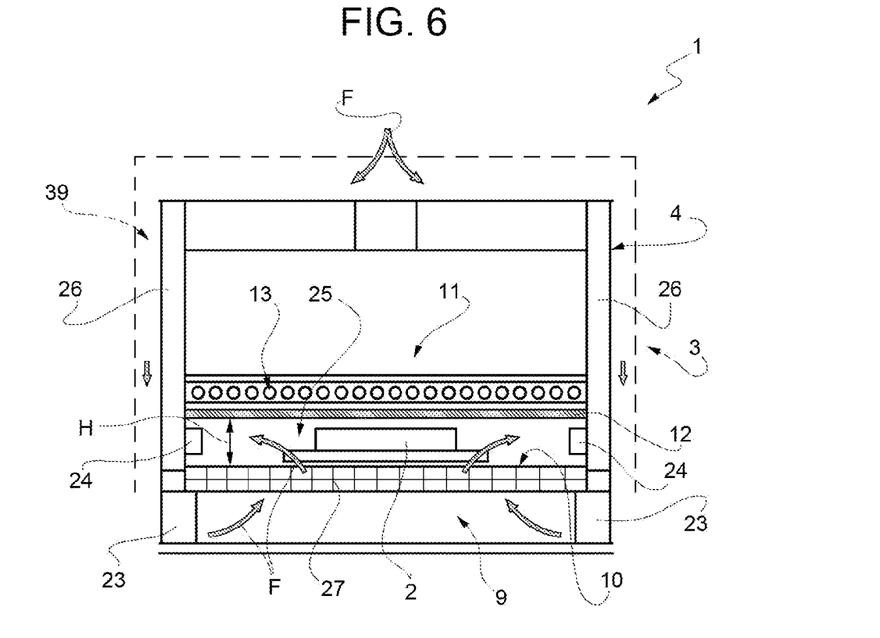
FIGS. 6 and 7 schematically illustrate the operation of the oven and plant of FIGS. 1 and 2.

According to an aspect of the invention, each heating device 11 comprises (FIGS. 5 and 6) a radiating plate 12 and at least one inductor 13 designed to heat the radiating plate 12 by electromagnetic induction. The radiating plate 12 of each device 11 is generally planar and is made of an electrically conductive material, preferably a ferromagnetic material and even more preferably a stainless steel. Each radiating plate 12 is arranged facing the resting surface 10, at a predetermined and relatively small distance H from the resting surface 10 (FIG. 6).

Here and hereinafter, by "relatively small distance" is meant a distance of the order of magnitude of centimeters, and therefore comprised between 1 and 19 centimeters. In particular, the distance H is chosen such that in use each radiating plate 12 is arranged at a distance not exceeding 1 cm from the friction elements 2 arranged side-by-side upon the resting surface 10, such a distance of a maximum of 1 cm having to be measured vertically from the side of the radiating plate 12 facing towards the resting surface 10.

Figure 1:
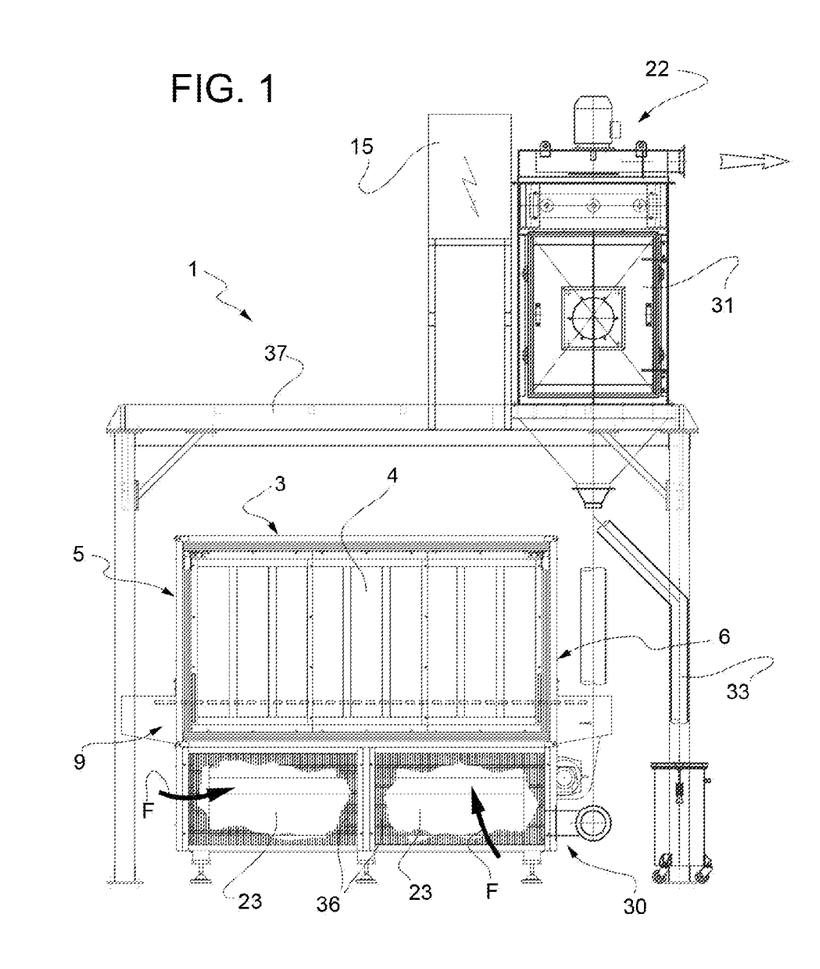
FIG. 1 shows a longitudinal schematic view in elevation of a plant for the heat treatment of friction elements, particularly brake pads, including the oven according to the invention.
Figure 2:
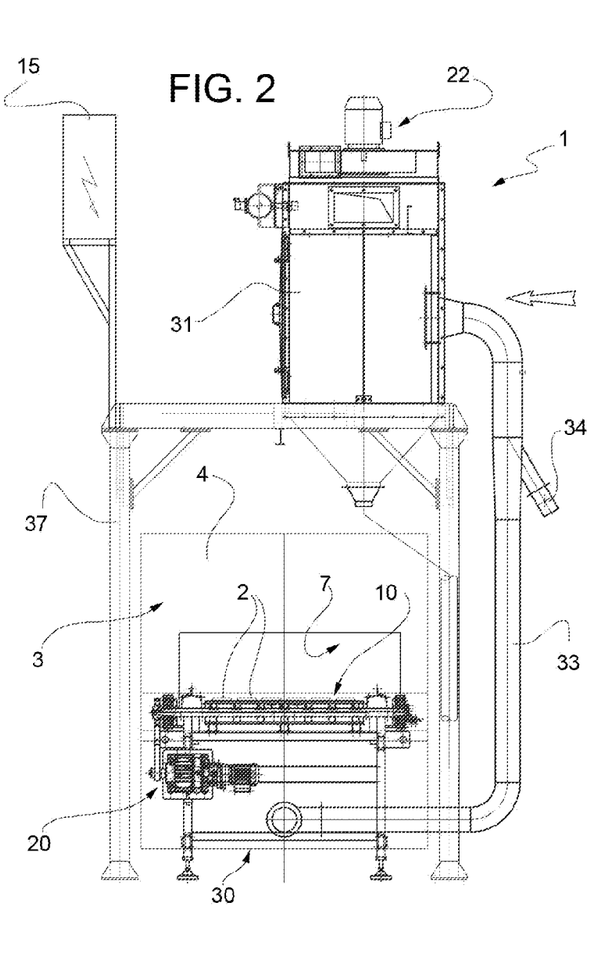
FIG. 2 shows a transversal schematic view in elevation of the plant of FIG. 1.

The at least one inductor 13 of each device 11 is arranged facing the radiating plate 12 spaced apart therefrom on the side opposite to the conveyor device 9 and is designed to uniformly heat the radiating plate 12 by electromagnetic induction to a predetermined temperature; with reference to the diagram shown in FIG. 7, each inductor 13 present is connected to a power supply 14 of alternating electric current and to a cooling liquid (for example water) supplier 15 for the inductor 13. The inductors 13 are manufactured in a known way, from copper tube 14 of a circular or prismatic cross section, coiled in a plane parallel to the resting plane of the plate 12 towards which the inductor 13 faces and the cooling liquid flows within said tube 14; the tube is then suitably wired in such a way as to be electrically powered with alternating current in order to generate an electromagnetic field; each heating device 11 may comprise a single inductor 13 or more than one suitably arranged inductors 13; in any case, the electrical power supply device 14 of each inductor or set of inductors 13 of each device 11 is preferably supplied independently of the others by means of a specific device 14; the devices 14 are preferably grouped together within a cabinet 15 (FIGS. 1 and 2).

The transport device 9 is an endless belt conveyor of a known type comprising a flat belt 16 (FIGS. 3 and 5) having opposite ends connected together to form a loop having an upper branch 17 and a lower branch 18; the upper 17 and lower 18 branches are stretched between respective rollers 19, at least one of which is equipped with a motorized device 20 in order to move the belt 16 on the rollers 19 in direction D; the upper branch 17 defines and delimits the resting surface 10.

According to an aspect of the invention, the tunnel oven 3 comprises a fan and/or a suction fan, in the non-limiting example schematically illustrated in FIG. 7 a fan 21 and a suction fan 22 arranged in series, hydraulically connected respectively with at least one suction opening 23 (FIG. 1) for ambient air arranged externally to the protective casing 4, and with a plurality of suction slots 24 (FIG. 3) arranged within the protective casing 4, between the resting surface 10 and the/each radiating plate 12, along respective opposite longitudinal sides of the resting surface 10 and of the radiating plate 12, in order to create within the tunnel casing 4 and between the resting surface 10 and the radiating plate(s) 12 a flow F of cooling air for the braking elements 2.

With reference to FIG. 7, the cooling air flow F is directed in counter-flow to the feeding direction D of the conveyor device 9 and, consequently, of the friction elements 2 within the oven 3; preferably, the suction slots 24 being arranged laterally, the flow F is also directed transversely to the feeding direction D of the conveyor device 9.

In particular (FIG. 6), the cooling air flow F is fed into a chamber 25 delimited by the resting surface 10, the single radiating plate 12 (in the case of the presence of only one device 11) or the plurality of radiating plates 12 (in the case of the presence of multiple devices 11 arranged in series along the conveyor device 9) and by respective lateral walls 26 of the protective casing 4; the friction elements 2 to be treated are arranged in use within this chamber 25; according to this arrangement and to a further characteristic of the invention, the resting surface 10 of the conveyor device 9 is air permeable, insofar that, as per the entire flat belt 16, it consists of a net or metallic mesh 27 (FIGS. 3 and 6) or of a perforated flexible element (belt) 28 (FIG. 3) or of a plurality of rigid perforated elements 29 connected to each other in an articulated manner (FIG. 5).

The flow F of cooling air is then, according to an aspect of the invention, fed into the chamber 25 through the resting surface 10 of the conveyor device 9, from the bottom upwards.

Figure 4:
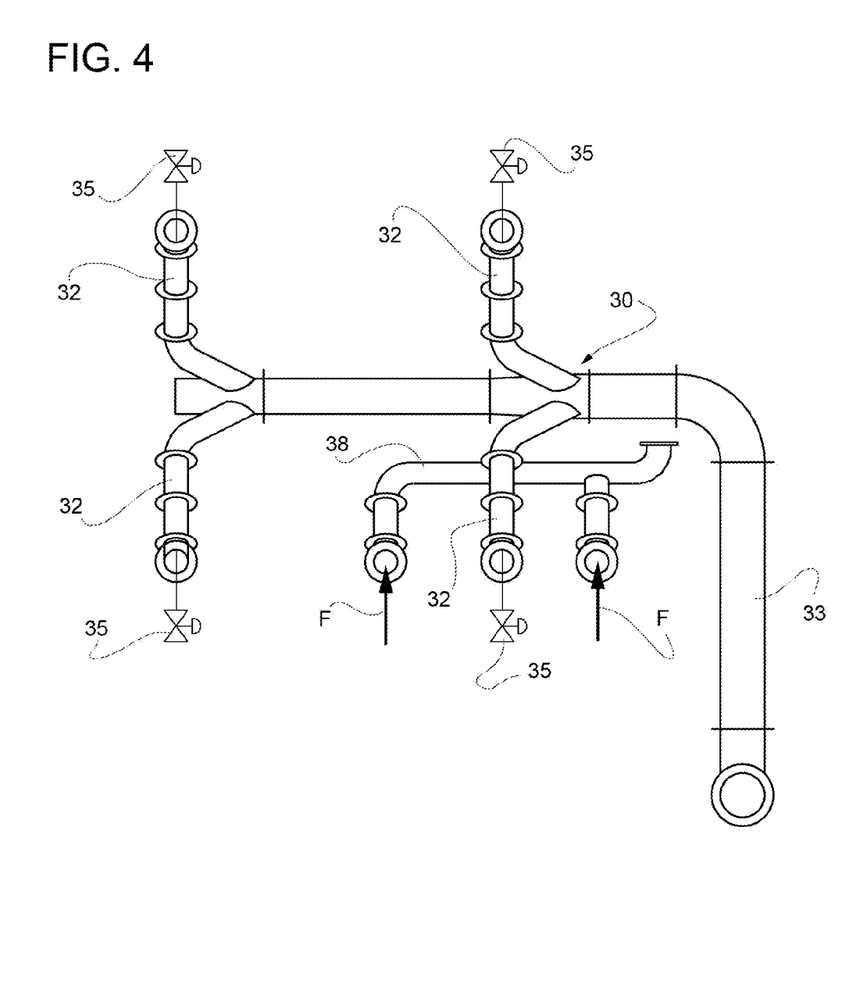
FIG. 4 schematically illustrates a plan view from above of further components of the tunnel oven according to the invention forming part of the plant of FIGS. 1 and 2 to be mounted beneath the component of FIG. 3.

The suction slots 24 are connected to a collecting manifold 30 for the cooling air flow F coming out from the tunnel casing 4; the manifold 30, which is partially illustrated in FIG. 3 and for the remaining part in FIG. 4 is arranged to one side and beneath the conveyor device 9 and is connected to a filtering device 31, preferably comprised of a bag filter, arranged externally to the tunnel casing 4.

The manifold 30 is provided with lateral branches 32 connected directly to the suction slots 24 and terminates at a tube 33 that connects to the filtering device 31; upstream of the filtering device 31, according to a further aspect of the invention, within the collecting manifold 30 and, in particular, on top of the tube 33, an inlet 34 (FIG. 2) is also provided for ambient air to be mixed with the cooling air flow F coming out from the tunnel casing 4 in order to lower its temperature. In this way the temperature of the air flow that enters the filtering device 31 can be maintained at around 90° C. and this allows for an efficient and inexpensive bag filter to be used.

At least one, two or all of the lateral branches 32 of the manifold 30 are preferably equipped with a choking valve 35 in order to adjust the flow rate of the cooling air flow F.

As already stated, the radiating plate/the radiating plates 12 is/are made of a ferromagnetic material and preferably of a stainless steel; and the inductors 13 are designed to heat each radiating plate 12 to a temperature of between 400° C. and 700° C.

In the example illustrated, the tunnel oven 3 forms part of the plant 1 for the heat treatment of the friction elements 2; there are two suction openings 23 on each side of the conveyor device 9, positioned beneath the same and beneath the tunnel casing 4 and protected by screens 36 (FIGS. 1 and 3). The oven 3 is housed beneath a reticular structure 37 (FIGS. 1 and 2) and the cabinet 15, the filter 31 and the suction fan 22 are mounted arranged on the top of the structure 37, suspended above the tunnel oven 3 and the device conveyor 9. Furthermore, beneath the conveyor device 9 a further collector 38 is mounted that collects the ambient air that enters through the screens 36 and that conveys said air to the end 6 of the tunnel casing 4 from where the flow F is fed into the chamber 25.

As it is schematically shown in FIG. 6, the flow F may also be aspirated from elsewhere, for example from the top of the structure 37 or otherwise deflected upwards before entering the chamber 25, in such a way as to cause the flow to pass into a cavity 39 internally surrounding the tunnel casing 4 which in this way is "actively" insulated, while the flow F is preheated before being introduced into the chamber 25.

From what described above, it is finally clear that the invention also relates to a method for the heat treatment of friction elements 2, in particular braking elements such as brake pads, comprising the following steps:
  arranging the friction elements 2, without overlapping, on a resting surface 10 of a conveyor device 9 designed for moving the friction elements 2 between an inlet opening 7 and an outlet opening 8 of a tunnel oven 3; and
  heating within the tunnel oven 3 the friction elements 2 by means of irradiation by at least one heating device 11 including a radiating plate 12 made from an electrically conductive material positioned such that it faces the resting surface 10 and which is heated to a preset temperature by electromagnetic induction by means of at least one inductor 13 arranged such that it faces the radiating plate 12 and spaced apart from the radiating plate 12 on the side opposite to the conveyor device 9;
  where the radiating plate 12 is arranged according to the invention at a distance of no more than 1 cm from the friction elements 2, and preferably at a distance of 5-7 mm from the friction elements 2, arranged upon the resting surface 10.

Furthermore, the method of the invention includes the step of feeding a cooling air flow F between the resting surface 10 and the radiating plate 12, which cooling air flow F is directed in counterflow to the feeding direction D of the conveyor device 9 and, preferably, also transversely to the feeding direction D of the conveyor device 9; the radiating plate/radiating plates being made of a stainless steel material and being heated to a temperature of between 400° C. and 700° C. With these parameters, the cooling air flow can be less than or equal to 1,000 m³/H.

In essence, the applicant has surprisingly found that using metal plates heated by means of induction, heating of the friction elements 2 is obtained that is comparable to that obtained to date using IR lamps, but obtaining thereby more uniform heating and therefore better results.

Also, the use of metallic radiating plates heated by induction allows a reduction in energy consumption of 40-50% to be obtained and a drastic reduction in the volume of cooling air, from 10,000 m³/h to 1,000 or even only 500 m³/h.

Furthermore, other than a reduction in the pollutants introduced into the atmosphere of more than 70%, insofar as these are more concentrated within the outlet cooling air flow F, which is also found to be at a lower temperature, and can therefore be effectively eliminated of dust by means of the bag filter 31 and of volatile products by means of post-combustion or by a catalyst downstream of the filter 31. Finally a reduction in bulk is obtained with more than a 50% reduction in the costs for the tubing with respect to a traditional system with IR lamps.

Each object of the invention has thus been achieved.

The invention claimed is:

1. A tunnel oven for the heat treatment of friction elements, said oven comprising:
  a tunnel shaped protective casing extending longitudinally between mutually opposing first and second open ends, delimiting an inlet opening and an outlet opening of the tunnel oven;
  a conveyor device placed within the protective casing and moving between the inlet opening and outlet opening, the conveyor device having a resting surface designed for receiving a plurality of said friction elements to be treated to transport them between the inlet opening and the outlet opening; and
  at least one heating device arranged within the protective casing, wherein the heating device comprises:
    a radiating plate made of electrically conductive material arranged such that the radiating plate faces the resting surface, at a fixed and relatively small distance from the resting surface, and
    at least one inductor arranged facing the radiating plate and spaced apart therefrom on the side opposite to the conveyor device, the at least one inductor being designed to heat the radiating plate by means of electromagnetic induction to a preset temperature, the at least one inductor being connected to a power supply of alternating electric current and to a refrigerating liquid supplier for the inductor.

2. The tunnel oven according to claim 1, further comprising at least one of a delivery fan or a suction fan hydraulically connected with at least one suction opening for ambient air, the suction opening being arranged externally to the protective casing, and with a plurality of suction slots arranged within the protective casing between the resting surface and the radiating plate, along respective opposite longitudinal sides of the resting surface and of the radiating plate, in order to create within the protective casing and between the resting surface and the radiating plate, a flow (F) of cooling air for the friction elements.

3. The tunnel oven according to claim 2, wherein the suction slots are connected to a collecting manifold for the cooling air flow coming out from the protective casing, said collecting manifold being connected to a filtering device, arranged externally to the protective casing and in which an inlet is provided upstream of the filtering device in the collecting manifold for ambient air to be mixed with the cooling air flow exiting the protective casing in order to lower its temperature.

4. The tunnel oven according to claim 3, wherein the filtering device is a bag filter.

5. The tunnel oven according to claim 2, wherein the cooling air flow (F) is directed in counterflow to a feeding direction (D) of the conveyor device.

6. The tunnel oven according to claim 5, wherein the cooling air flow is directed transversely to the feeding direction of the conveyor device.

7. The tunnel oven according claim 2, wherein the cooling air flow (F) is fed into a chamber delimited by the resting surface, the radiating plate and by respective lateral walls of the protective casing, and within which chamber in use the friction elements to be treated are arranged, the resting surface of the conveyor device being air permeable, in that it consists of at least one of a net or metallic mesh, or of a perforated flexible element, or a plurality of rigid perforated elements connected to each other in an articulated manner; said cooling air flow being fed into the chamber through the resting surface of the conveyor device, from the bottom upwards.

8. The tunnel oven according to claim 1, wherein the protective casing is insulated and contains a plurality of heating devices, which are independent of each other, arranged in sequence within the protective casing in the feeding direction (D) of the conveyor device and each one including a radiating plate and at least one inductor for heating the radiating plate by means of electromagnetic induction.

9. The tunnel oven according to claim 1, wherein the radiating plate is made of a ferromagnetic material, the at least one inductor being designed to heat the radiating plate to a temperature between 400° C. and 700° C.

10. The tunnel oven according to claim 9, wherein the radiating plate is made from stainless steel.

11. A plant for the heat treatment of friction elements, comprising a tunnel oven according to claim 1.

12. The tunnel oven according to claim 1, in which the friction elements are braking elements, such as brake pads.

13. A method for the heat treatment of friction elements comprising:
arranging the friction elements, without overlapping, on a resting surface of a conveyor device designed for moving the friction elements between an inlet opening and an outlet opening of a tunnel oven;
heating within the tunnel oven the friction elements by means of irradiation using at least one heating device including a radiating plate made from an electrically conductive material positioned such that the radiating plate faces the resting surface, and which the radiating plate is heated to a preset temperature by electromagnetic induction by means of at least one inductor arranged facing the radiating plate spaced apart therefrom on the side opposite to the conveyor device;
the radiating plate being arranged at a distance of no more than 1 cm from the friction elements arranged upon the resting surface.

14. The method according to claim 13, further comprising:
feeding a cooling air flow (F) between the resting surface and the radiating plate, the cooling air flow (F) being directed in counterflow to the feeding direction (D) of the conveyor device and, the radiating plate being made of a stainless steel material and being heated to a temperature of between 400° C. and 700° C.

15. The method according to claim 13, wherein the friction elements are braking elements, such as brake pads.

16. The method according to claim 14, wherein the cooling air flow is directed transversely to the feeding direction of the conveyor device.

* * * * *